H. W. LESTER & A. M. STARR.
AUTOMOBILE MIRROR MOUNT.
APPLICATION FILED NOV. 30, 1917.
1,290,252.
Patented Jan. 7, 1919.
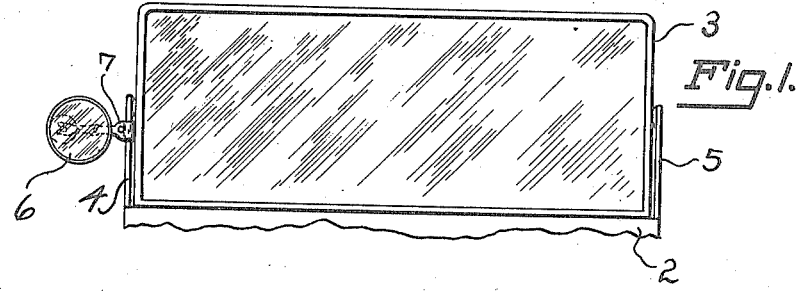
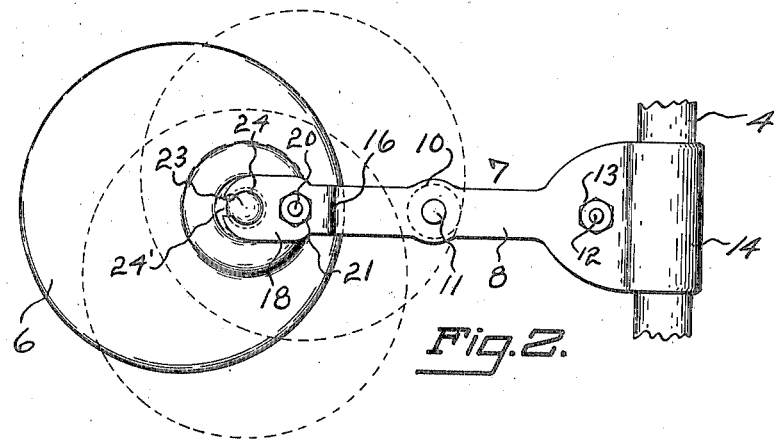
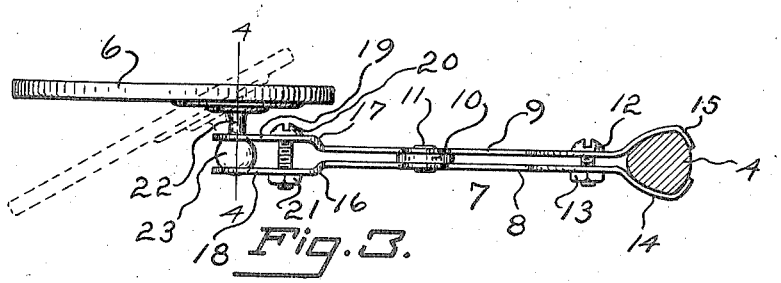
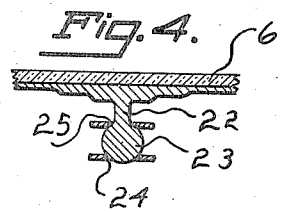

UNITED STATES PATENT OFFICE.

HOWARD W. LESTER, OF HARTFORD, AND AMBROSE M. STARR, OF EAST HAMPTON, CONNECTICUT, ASSIGNORS TO THE POST & LESTER COMPANY, OF HARTFORD, CONNECTICUT, A CORPORATION OF CONNECTICUT.

AUTOMOBILE MIRROR-MOUNT.

1,290,252.  Specification of Letters Patent.  Patented Jan. 7, 1919.

Application filed November 30, 1917. Serial No. 204,518.

*To all whom it may concern:*

Be it known that we, HOWARD W. LESTER and AMBROSE M. STARR, citizens of the United States, residing at Hartford and East Hampton, respectively, in the county of Hartford and Middlesex and State of Connecticut, have invented certain new and useful Improvements in Automobile Mirror-Mounts, of which the following is a specification.

This invention relates to what we will for convenience term an "automobile mirror mount", the object of the invention being to provide an article of this character by means of which the mirror can be easily and quickly adjusted so as to cover a wider field than is at present possible with devices of this kind. The appliance may be carried upon any desirable part of an automobile, but it is usually connected with the wind shield, although this as will be inferred, may not be necessary in all cases.

In the drawings accompanying and forming part of the present specification we have shown in detail one convenient form of embodiment of the invention which, to enable those skilled in the art to practice the same, will be set forth fully in the following description. We do not necessarily limit ourselves to this particular disclosure; we may depart therefrom in several respects within the scope of the invention defined by the claims following said description.

Referring to said drawings:

Figure 1 is a view of part of the dash and wind shield of an automobile, the dash being equipped with a mirror mount involving the invention.

Fig. 2 is an elevation of the mirror mount showing the same connected with a side bar, and by full and dotted lines several positions of the mirror.

Fig. 3 is a top plan view with the side bar in horizontal section, the mirror being shown in one position by full lines and in a laterally adjusted position by dotted lines.

Fig. 4 is a cross section on the line 4—4 of Fig. 3.

Like characters refer to like parts throughout the several views which are on different scales, that of Fig. 1 being smaller than the remaining views.

As we have already noted, the mirror is especially well adapted for use in conjunction with an automobile. When so utilized it may be associated with any desirable part of the car, generally but not imperatively the wind shield. As the wind shield is adjustable, the mirror is not really connected thereto but to its frame. The mirror might be supported upon the running-board or some other convenient part of the vehicle. With the foregoing general observations, we will now refer more in detail to what is illustrated.

In Fig. 1 we have shown the dash 2 and wind shield 3 of an automobile. These may be the parts in question of any of the several cars upon the market. The dash as shown is equipped with two side bars or uprights 4 and 5 between which the wind shield 3 is assumed to be mounted for swinging movement. The bar 4 as shown constitutes a support for the mirror mount which involves a mirror as 6. Said mirror as shown is circular in form. Although this is quite the preferable shape, it is not essential that we always have it so. It is conceivable that it might be rectangular. The mirror comprises as usual in such an article, a metal body, a glass and a suitable reflector.

The carrier for the mirror is denoted by 7. It comprises duplicate strips 8 and 9 between which is interposed the washer 10. Through the strips and washer the rivet 11 may extend and may be headed over the outer surfaces of the two strips 8 and 9. The strips near their rear are perforated to receive the screw 12 furnished with a nut 13. The inner ends of the two strips are provided with hooks 14 and 15 which are intended to engage for instance around the upright bar 4. By turning the nut 13. these hooks 14 and 15 will be caused to tightly embrace the bar to hold the carrier or support 7 in rigid relation therewith.

The strips 8 and 9 near their outer ends are bent outward as at 16 and 17 and are then in parallelism as at 18 and 19, the parallel portions or arms 18 and 19 being perforated to receive the screw 20 provided with the nut 21 by which said parallel portions 18 and 19, on the turning of said nut, can be drawn toward each other.

The mirror 6 is provided on its back or body with a rearwardly extending rigid stud 22 terminating in the ball or spherical head 23 which fits circular openings 24 and 25 respectively in the parallel portions or arms 18 and 19. By tightening the nut 21, the arms or parallel portions 18 and 19 can be caused to substantially embrace the sphere 23 to prevent too free movement thereof. There is sufficient movement, however, to permit the mirror being tilted as shown for example by dotted lines in Fig. 3. There may be cases where this tilt is desirable. As a matter of fact, as will be inferred, the mirror is susceptible when desired of a compound adjustment. It will be seen that the slots 24' lead from the respective circular openings 24 and 25. Into one or both of these slots the shank or stud 22 may be tipped in the lateral adjustment of the mirror as distinguished from its rotary adjustment.

It will be noticed that the stud or projection 22 extends from the mirror 6 eccentrically thereof. This stud and its ball end 23 present a pivot for the mirror, so that in addition to being able to secure the lateral adjustment to which we have referred, we can and what is more important, adjust the mirror about its axis of motion, this axis being eccentric of the mirror. In Fig. 2 we have shown by full lines the maximum turning or rotary adjustment of the mirror and by the dotted upper lines the minimum turning adjustment, while the lower dotted lines in this particular view illustrate an intermediate turning adjustment. Obviously the mirror can be rotatively adjusted between these two extreme positions. It will be obvious that owing to this rotative adjustment of an eccentrically mounted mirror, it can be made to cover a very wide field, considerably wider in fact than is at present possible with existing devices of this character.

It will be clear from the foregoing description that there is provided a shank having at one end a fork and provided at its other end with means for its detachable connection with part of an automobile. The branches of the fork are slotted to receive the eccentric stud or pivot on the back of the mirror, one of the slots receiving the ball or sphere on the stud or pivot.

What we claim is:

1. The combination of a shank provided with means for its connection with part of an automobile, and a mirror provided on its back with an eccentric pivot supported by the shank for adjustment about the axis of the pivot which extends through the mirror and also for lateral adjustment.

2. The combination of a shank provided with means for its connection with part of an automobile, the shank having a fork, the branches of which are slotted, and a mirror provided on its back with an eccentric pivot provided with a ball, the pivot being fitted in one of the slots and the ball being received in the other.

3. The combination of a mirror and its carrier, the carrier being provided with means for its connection with part of an automobile, the mirror being pivoted eccentrically to the carrier for rotary adjustment in its own plane about an axis extending through the mirror and also for lateral adjustment.

4. The combination of a shank provided with means for its connection with part of an automobile, a mirror provided on its back with an eccentric stud pivotally carried by the shank for rotary and lateral adjustments, and means for holding the stud in a predetermined position.

In testimony whereof we affix our signatures in the presence of two witnesses.

HOWARD W. LESTER.
AMBROSE M. STARR.

Witnesses for Lester:
L. L. MARKEL,
HEATH SUTHERLAND.

Witnesses for Starr:
BESSIE DUANE,
M. T. WALL.